(12) United States Patent
Medlock et al.

(10) Patent No.: US 11,200,503 B2
(45) Date of Patent: Dec. 14, 2021

(54) SEARCH SYSTEM AND CORRESPONDING METHOD

(71) Applicant: Microsoft Technology Licensing, LLC, Redmond, WA (US)

(72) Inventors: Benjamin Medlock, London (GB); David Paul Williams, Worcestershire (GB); James Aley, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1035 days.

(21) Appl. No.: 14/758,221

(22) PCT Filed: Dec. 27, 2013

(86) PCT No.: PCT/GB2013/053433
§ 371 (c)(1),
(2) Date: Jun. 26, 2015

(87) PCT Pub. No.: WO2014/102548
PCT Pub. Date: Jul. 3, 2014

(65) Prior Publication Data
US 2015/0347920 A1 Dec. 3, 2015

(30) Foreign Application Priority Data
Dec. 27, 2012 (GB) .................... 1223450

(51) Int. Cl.
*G06N 7/00* (2006.01)
*G06F 3/0484* (2013.01)
(Continued)

(52) U.S. Cl.
CPC ........... *G06N 7/005* (2013.01); *G06F 3/0484* (2013.01); *G06F 16/3346* (2019.01);
(Continued)

(58) Field of Classification Search
CPC .... G06N 7/005; G06N 99/005; G06F 3/0484; G06F 17/30687; G06F 17/30864; G06F 17/30997
See application file for complete search history.

(56) References Cited

U.S. PATENT DOCUMENTS 7,831,685 B2 * 11/2010 Dai .................. G06Q 30/02
709/217
7,836,060 B1 11/2010 Rennison
(Continued)

FOREIGN PATENT DOCUMENTS

CN 1658134 A 8/2005
CN 1707409 A 12/2005
(Continued)

OTHER PUBLICATIONS

Bespalov, et al., "Sentiment Classification Based on Supervised Latent n-gram Analysis", CIKM'11, Proceedings of 20th ACM International Conference on Information and Knowledge Management, pp. 357-382, Oct. 2011 (Year: 2011).*
(Continued)

*Primary Examiner* — Tsu-Chang Lee
(74) *Attorney, Agent, or Firm* — Schwegman Lundberg & Woessner, P.A.

(57) ABSTRACT

There is provided a search system comprising a statistical model trained on text associated with a piece of content. The text associated with the piece of content is drawn from a plurality of different data sources. The system is configured to receive text input and generate using the statistical model an estimate of the likelihood that the piece of content is relevant given the text input. A corresponding method is also provided.

17 Claims, 1 Drawing Sheet

(51) Int. Cl.
*G06N 20/00* (2019.01)
*G06F 16/951* (2019.01)
*G06F 16/33* (2019.01)
*G06F 16/907* (2019.01)

(52) U.S. Cl.
CPC .......... *G06F 16/907* (2019.01); *G06F 16/951* (2019.01); *G06N 20/00* (2019.01)

(56) References Cited

U.S. PATENT DOCUMENTS

| | | | |
|---|---|---|---|
| 8,990,235 B2 * | 3/2015 | King | G06F 17/2211 707/759 |
| 9,129,008 B1 * | 9/2015 | Kuznetsov | G06F 16/435 |
| 2008/0244446 A1 | 10/2008 | Lefevre et al. | |
| 2008/0294982 A1 | 11/2008 | Leung et al. | |
| 2009/0083023 A1 | 3/2009 | Foster et al. | |
| 2010/0125568 A1 | 5/2010 | van Zwol et al. | |
| 2010/0217648 A1 * | 8/2010 | Agarwal | G06Q 10/04 705/7.31 |
| 2011/0043652 A1 | 2/2011 | King et al. | |
| 2011/0246457 A1 * | 10/2011 | Dong | G06Q 10/06 707/725 |
| 2012/0029910 A1 | 2/2012 | Medlock et al. | |
| 2013/0159919 A1 | 6/2013 | Leydon | |
| 2013/0332162 A1 | 12/2013 | Keen | |
| 2016/0292148 A1 | 10/2016 | Aley et al. | |

FOREIGN PATENT DOCUMENTS

| | | |
|---|---|---|
| CN | 101354714 A | 1/2009 |
| CN | 101589425 A | 11/2009 |
| CN | 102326144 A | 1/2012 |
| CN | 102439542 A | 5/2012 |
| CN | 102640089 A | 8/2012 |
| CN | 102737042 A | 10/2012 |
| WO | WO 2010/112841 A1 | 10/2010 |
| WO | WO 2011/042710 A1 | 4/2011 |
| WO | 2012156686 A1 | 11/2012 |
| WO | 2013107998 A1 | 7/2013 |

OTHER PUBLICATIONS

"First Office Action and Search Report Issued in Chinese Patent Application No. 201380068827.X", dated Jan. 8, 2018, 12 Pages.

"Welcome to Apache Lucene", Retrieved From: https://web.archive.org/web/20160624143943/http://lucene.apache.org/, Retrieved Date: Jun. 24, 2016, 22 Pages.

"Nearest Neighbor Search", Retrieved From: https://en.wikipedia.org/w/index.php?title=Nearest_neighbor_search&oldid=723618186, Jun. 4, 2016, pp. 1-7.

"Office Action Issued in European Patent Application No. 13821126.3", dated Oct. 5, 2018, 6 Pages.

"Second Office Action Issued in Chinese Patent Application No. 201380068827.X", dated Sep. 3, 2018, 10 Pages.

"First Office Action and Search Report Issued in Chinese Patent Application No. 201480067660.X", dated Dec. 12, 2017, 24 Pages.

"Second Office Action Issued in Chinese Patent Application No. 201480067660.X", dated Sep. 5, 2018, 17 Pages.

PCT/GB2014/053688, "International Search Report and Written Opinion Issued in PCT Application No. PCT/GB2014/053688", dated Feb. 23, 2015, 10 Pages.

"Oral Hearing Issued in European Patent Application No. 13821126.3", dated Feb. 25, 2019, 7 Pages.

"Third Office Action and Search Report Issued in Chinese Patent Application No. 201380068827.X", dated Mar. 20, 2019, 20 Pages.

"Third Office Action Issued in Chinese Patent Application No. 201480067660.X", dated May 7, 2019, 44 Pages.

"Non Final Office Action Issued in U.S. Appl. No. 15/179,833", dated Mar. 8, 2019, 47 Pages.

"Final Office Action Issued in U.S. Appl. No. 15/179,833", dated Oct. 3, 2019, 41 Pages.

"Office Action Issued in European Patent Application No. 13821126.3", dated Oct. 14, 2019, 11 Pages.

"Fourth Office Action Issued in Chinese Patent Application No. 201380068827.X", (w/ Concise Statement of Relevance), dated Nov. 8, 2019, 10 Pages.

"Office Action Issued in European Patent Application No. 14819056.4", dated Feb. 26, 2020, 5 Pages.

"Notice of Allowance Issued in Chinese Patent Application No. 201380068827.X", dated Apr. 7, 2020, 8 Pages.

"Office Action Issued in Korean Patent Application No. 10-2016-7018754", dated Nov. 23, 2020, 26 Pages.

"Office Action Issued in Indian Patent Application No. 201647019863", dated Oct. 28, 2020, 7 Pages.

* cited by examiner

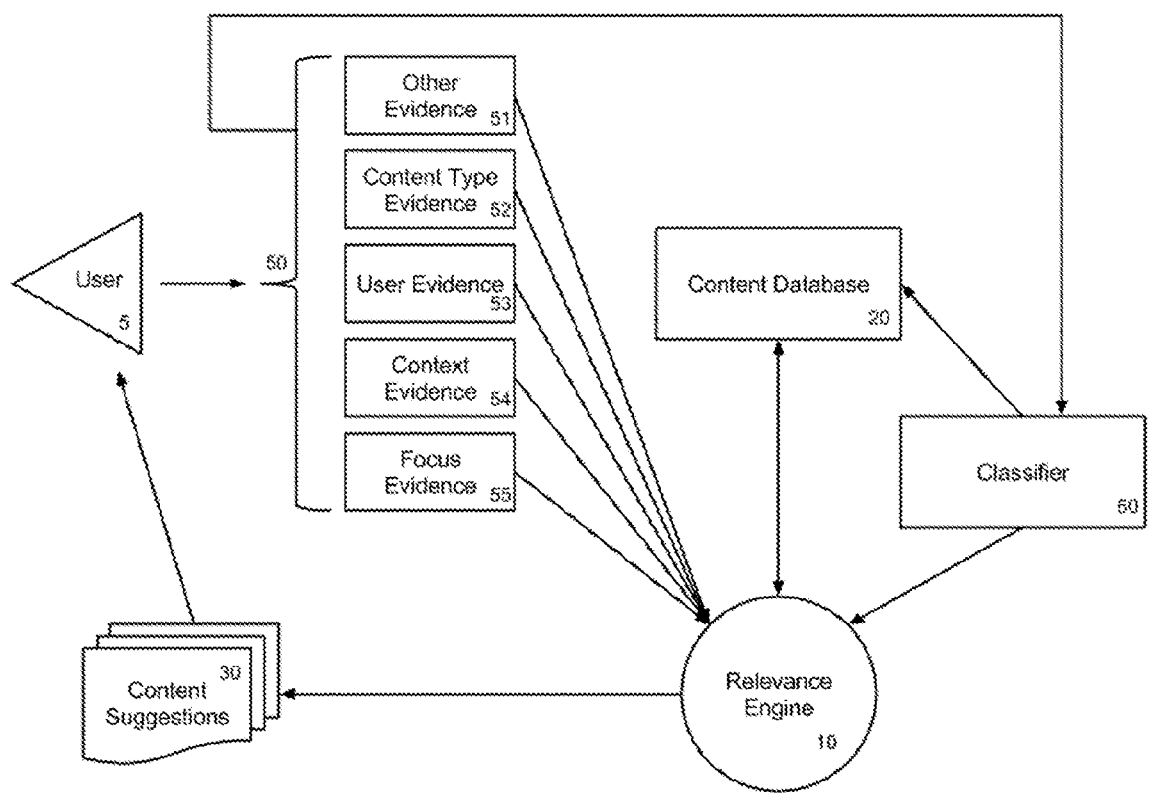

SEARCH SYSTEM AND CORRESPONDING METHOD

CROSS-REFERENCE TO RELATED APPLICATIONS

This application is the National Stage of International Application No. PCT/GB2013/053433, filed Dec. 27, 2013, which claims the benefit of Great Britain Patent Application No. 1223450.6 filed Dec. 27, 2012, the disclosures of which are incorporated herein by reference in their entireties.

The present invention relates to an electronic search system, e.g. an electronic search engine, and a corresponding method for electronically searching.

Traditionally, search engines have been designed to return a relevant document (e.g. webpage) in response to a user query. To do this, search engines compare a user query (comprised of keywords) to index terms or tags assigned to a particular webpage. If the user-inputted keywords and webpage index terms match, then the search engine will return the webpage as relevant to the user query.

However, this approach has several drawbacks. In order to use a traditional search engine, the user must distil his search query into a number of relevant keywords, or a short question, and the result of the search is, in general, highly dependent on the user's choice of keywords. Traditional search engines are unequipped to deal with a large volume of input text, or natural language text. Furthermore, traditional search engines are limited to returning one or more specific documents as results.

Moreover, if the set of index terms associated with a particular webpage does not include one of the keywords then a traditional search engine may erroneously discard a webpage as irrelevant.

The present invention provides search systems and searching methods which address some of the drawbacks of traditional search engines.

The present invention relates to a probabilistically-motivated search system, which may take into account a range of evidence sources to provide relevant content to a user. The system and method of the present invention use statistical models derived from datasets associated with identifiable pieces of content, to provide relevant content suggestions to a user, either from an explicit search query or from some other text input.

In a first aspect of the present invention, there is provided a search system configured to receive text input, generate an estimate for each of a plurality of pieces of content of the likelihood that the piece of content is relevant given the text input, and optionally output one or more of the most relevant pieces of content as content suggestions.

The preferred embodiment of the search system comprises a statistical model. The statistical model is trained on text associated with a piece of content, wherein the text associated with the piece of content is drawn from a plurality of different data sources. The system is configured to receive text input and generate using the statistical model an estimate of the likelihood that the piece of content is relevant given the text input.

In a preferred embodiment, the statistical model is trained on features extracted from the text associated with the piece of content, wherein the system further comprises a feature extraction mechanism configured to extract features from the text input, and a relevance mechanism that is configured to query the statistical model with each feature of the text input to generate an estimate of the likelihood that the piece of content is relevant given the text input.

Preferably, the system comprises a plurality of statistical models trained on text associated with a plurality of pieces of content. The system is configured to generate an estimate of the likelihood that each piece of content of the plurality of pieces of content is relevant given the text input using the statistical model associated with that piece of content.

The system may be configured to rank the pieces of content by relevance and determine one or more of the most relevant pieces of content.

The system may be configured to output at least one representation of each of the one or more most relevant pieces of content.

The system may be configured to output the one or more most relevant pieces of content.

The piece of content may be a particular entity or the piece of content may be associated with a particular entity. The system may be configured to output at least one representation of one or more entities associated with the one or more most relevant pieces of content.

The system may comprise a statistical model that is trained on non-textual data relating to one or more pieces of content. The system preferably configured to receive non-textual evidence and generate using the statistical model that is trained on non-textual data an estimate of the likelihood that the piece of content is relevant given the non-textual evidence.

The system may comprise a classifier configured to classify the text input.

The classifier may be configured to classify each of the plurality of statistical models trained on text by content type, classify the text input by content type, and determine a subset of the plurality of statistical models which are of the same content type as the text input. The relevance engine is preferably configured to query each of the statistical models of the subset of statistical models with each feature of the text input to generate an estimate of the likelihood that each piece of content associated with each model of the subset of models is relevant given the text input.

The system may comprise a first language model trained on natural language text and a second language model trained on conversational text. The classifier may be configured to compare a portion of the text input to the first and second models to classify the portion of text input as natural language or conversational. Preferably, the system is configured to discard the portion of text input if it is classified as conversational.

The text input may be entered into the system by a user. Alternatively, the text input is not input into the system by a user. For example, the text input is supplied to the system without user intervention, e.g. the system may receive text input from, without limitation, a television or radio broadcast, an internet webpage, an email conversation, a newsfeed etc.

The system may be configured to generate the estimates of the likelihood that the pieces of content are relevant using a plurality of evidence sources, one of which is the text input. The system may therefore be configured to receive a plurality of pieces of evidence.

Preferably, the system comprises a content database, in which each piece of content is associated with a plurality of dataset types (e.g. text, user click history, etc.). Preferably, each piece of content is associated with a content type (e.g. film, literature, etc.). Preferably, the content database comprises at least one language-based statistical model associated with each piece of content, where the at least one language-based statistical model is trained on the text dataset associated with that piece of content. Preferably, the system is configured to feed the input text into the plurality of language-based statistical models to generate a relevance likelihood estimate for each piece of content given the input text. Preferably the system uses non-textual evidence in addition to input text to generate the likelihood estimates.

A language-based statistical model is a statistical model which has been trained on text.

In a second aspect of the present invention, there is provided a method of searching content to provide one or more content suggestions. The method comprises receiving text input, generating an estimate for each of a plurality of pieces of content of the likelihood that the piece of content is relevant given the text input, and optionally outputting one or more of the most relevant pieces of content as content suggestions.

In a preferred embodiment, the method is a method for determining whether a piece of content is relevant to text input. The method comprises receiving text input at a search system and generating, using a statistical model trained on text associated with a piece of content, an estimate of the likelihood that the piece of content is relevant given the text input. The text associated with the piece of content is drawn from a plurality of different data sources.

In a preferred embodiment, the statistical model is trained on features extracted from the text associated with the piece of content. The method further comprises extracting, using a feature extraction mechanism, features from the text input, and querying, using a relevance mechanism, the statistical model with each feature of the text input to generate an estimate of the likelihood that the piece of content is relevant given the text input.

The method preferably comprises generating, using a plurality of statistical models trained on text associated with a plurality of pieces of content, an estimate of the likelihood that each piece of content of the plurality of pieces of content is relevant given the text input using the statistical model associated with that piece of content.

The method may further comprise ranking the pieces of content by relevance and determining one or more of the most relevant pieces of content.

The method may further comprise outputting at least one representation of each of the one or more most relevant pieces of content.

The method may further comprise outputting the one or more most relevant pieces of content.

The piece of content may be a particular entity. The piece of content may be associated with a particular entity, the method further comprising outputting at least one representation of one or more entities associated with the one or more most relevant pieces of content.

The method may comprise generating an estimate of the likelihood that each piece of content of the plurality of pieces of content is relevant given non-textual evidence using a statistical model that is trained on non-textual data relating to one or more pieces of content.

In one embodiment, the method comprises classifying with a classifier the text input.

The method may comprise classifying with the classifier each of the plurality of statistical models trained on text by content type; classifying the text input by content type; and determining a subset of the plurality of statistical models which are of the same content type as the text input.

The method may comprise querying with the relevance engine each of the statistical models of the subset of statistical models with each feature of the text input and generating an estimate of the likelihood that each piece of content associated with each model of the subset of models is relevant given the text input.

The system may comprise a first language model trained on natural language text and a second language model trained on conversational text, and the method may comprise comparing with the classifier a portion of the text input to the first and second models; and classifying the portion of text input as natural language or conversational. The method may further comprise discarding the portion of text input if it is classified as conversational.

The text input is text input by a user. Alternatively, the text input is not input into the system by a user.

Preferably, the estimates of the likelihoods that the pieces of content are relevant are generated from a plurality of evidence sources, one of which is the text input. The method may comprise receiving one or more additional pieces of evidence.

Preferably the step of generating estimates comprises basing estimates on non-textual evidence in addition to input text.

In a third aspect of the invention, there is provided a computer program product comprising a computer readable medium having stored thereon computer program means for causing a processor to carry out any one of the above described methods.

Content is a term well known to a person skilled in the art, and may include, without limitation one of a document, a news story, a video, an image, an app, a sound segment, a text segment, etc. In the context of the present application, 'a piece of content' is particular content (e.g. a particular film, book, news story, app, etc.) that has associated with it data which is drawn from a plurality of different data sources (e.g. a link to the app, the text of the app, reviews of the app, number of app downloads, etc.), which may comprise textual and non-textual (e.g. click history) data. For example, a piece of content may be a particular book and the data sources may include the contents of the book, the click history for that book on sales websites, reviews of that book, a film based on the book, etc. A content suggestion is any entity with an associated semantic type that is accessible electronically to a user. The term 'content suggestion' therefore encompasses entities such as a named concept or topic, including a place, event, object, film, book, sports team, song, painting, computer game, app, etc.

Entities can be identified within the data sources associated with a particular piece of content by any suitable means, manual or automatic, e.g. using a website crawling technique. The content suggestion may correspond to the most likely piece of content, where that piece of content itself is a named concept or topic or it may be an entity associated with one or more of the most likely pieces of content, where the pieces of content are more specific than an entity, for example the concept or topic might be an app, and the most likely piece of content might be reviews of that app (e.g. drawn from a plurality of webpages).

The output of the search engine, the 'content suggestions', may be one or more of the most relevant entities or pieces of content. However, in a preferred embodiment, the output of the search engine is one or more representations of the one or more most relevant entities or pieces of content.

A representation of a piece of content or an entity may, for instance, comprise text (such as a name, a title, a brief summary, introduction or definition), an image (such as a photo of a person or a place, or a book cover or film poster), a video clip (such as a movie trailer), a URL (such as the address of an official website associated with the entity, a Wikipedia page related to the entity, a news story about the entity or a webpage selling the entity), or any combination thereof. The representation for a piece of content or an entity may be static and stored with an associated statistical model. Alternatively, the representation may be dynamic, for instance the search engine may be configured to scrape data from the data sources associated with a particular piece of content or entity, or the data may be scraped from content associated with the entity. For example, the scraped data may include the first paragraph of a Wikipedia article, or an image of a book cover from Amazon. The representation selected to be displayed to the user may depend on the specific use of the search system or on user evidence (such as user history etc.)

FIG. 1 is a block diagram of the high level system architecture according to the invention. The system of the present invention comprises a Relevance Engine 10 which assigns relevance probability estimates to content and uses these probability estimates to generate relevant content suggestions 30 to be presented to a user 5. The user 5 may be presented with the most relevant content suggestions 30 or a ranked list of the p most relevant content suggestions 30. In a preferred embodiment, the system of the present invention is an electronic device, which may be a computer or server, for example, that has a search engine in accordance with the invention to identify content suggestions 30 relevant to a system query, and which may be interacted with or accessed by another electronic device, such as a computer, a tablet, a mobile telephone, or any other suitable electronic device.

The system query may correspond to a user query, for example a user inputted question to find relevant content, e.g. "When is the last posting date for Christmas?". The user query encompasses any means the user may input a query, for example the user may speak the query into an electronic device, rather than directly typing the query into the device. The electronic device comprises a means for receiving a user query, which may be any suitable means, including one or more of a means for receiving user inputted text, voice recognition means for receiving a user spoken query or any other user interface between the user and the device.

Although FIG. 1 shows the relevance engine 10 generating content suggestions 30 from user evidence (which includes a user entered query 54, as well as any number of other types of user evidence 53, for example click history), the trigger for a content search could be text input received by the relevance engine from another system (e.g. a text string from a news broadcast) 51, rather than from user entered text input 54.

Unlike traditional search engines, which require a user to input or select appropriate keywords, the system of the present invention is configured to take raw evidence sources 50 and trigger a search for relevant content based on the evidence sources 50, without manual intervention. As will be explained in more detail below, the present system is also capable of dealing with natural language text strings without keyword selection, which also distinguishes the present system from the traditional search engines.

Returning to FIG. 1, to generate the relevant content suggestions 30, the relevance engine 10 uses a Content Database 20, and one or more of a plurality of evidence sources 50 including Context Evidence 54, Focus Evidence 55, Content Type Evidence 52, User Evidence 53 and Other Evidence 51. To trigger a search, the relevance engine 10 requires text input of some kind, i.e. user entered 53 or received from another system 51.

The Content Database 20 associates individual pieces of content with a number of data sets from which statistical models can be trained. Preferably, the statistical models comprise at least one language-based statistical model and, optionally, a statistical model that is not language based (e.g. a model that estimates user relevance given prior click history on particular pieces of content or pieces of content associated with a particular entity). The data sets comprise text datasets and optionally other datasets associated with each piece of content and/or entity, such as, without limitation, user ratings, click information, URL address etc. Text datasets can be, without limitation, reviews, comments, and descriptions of the content and/or entity. The content database also associates content with representations thereof which can be presented to users. The content database may be structured by content type to facilitate the generation of content suggestions. In addition, to structuring by content type, it is possible to structure the database 20 by entities, for example particular topics or subjects. The pieces of content may themselves relate to a particular entity and/or they may be associated with an entity. By structuring the Database 20 by content type and entities, it is possible to facilitate the retrieval of content suggestions which relate to relevant content type or entities.

The content database 20 comprises a plurality of language-based statistical models, where a language-based statistical model is associated with each piece of content and is trained on the text dataset associated with that piece of content. If desirable, the language-based statistical model could be a language model which models a sequential distribution over the terms in the text dataset, such as that disclosed in PCT application published under WO2010/112841 in the name of TouchType Limited. Preferably, the statistical models are structured by content-type or entities.

Each text dataset is extracted from a plurality of different data sources. The data sources do not therefore need to explicitly comprise text, but do need to be of a type which allows text extraction, for example, text (the dialogue) can be extracted from a film. Since the text dataset associated with each piece of content is formed from a plurality of different data sources, the datasets on which the language-based content-specific statistical models are trained comprise considerably more text than would be found from a single source (for example, on a single webpage). This has several beneficial effects. Using the content-specific statistical models, a comparison may be made between the large corpus of text associated with a specific piece of content and a large volume of natural language input text (text evidence) to establish the relevance of the piece of content to the text evidence. This is not a practical approach when the corpus of text is limited to the text from a single source since there is, in general, not enough text data in a single source to create a statistical model which is comprehensive enough for this purpose.

Moreover, drawing text relevant to a particular piece of content from a plurality of different data sources provides the relevance engine 10 with a more complete view of the piece of content than would be provided by a single data source. To take a simple example, if the input text evidence 53 comprised "A movie which is a black comedy about a kidnapping set in snowy North Dakota featuring a pregnant cop", a traditional search engine would only return a webpage which happened to mention all of the words in the search query in that single webpage. By training language-based statistical models on text data related to a piece of content from a plurality of different data sources (e.g. movie reviews, the movie dialogue, a Wikipedia article, etc.), the relevance engine 10 may identify the relevant piece of content (e.g. in this case the relevant film) even if the words of the text evidence 53 are not all contained in the same data source. Differences in style of language and choice of vocabulary between different data sources result in a comprehensive language-based statistical model which allows relevant content to be identified, regardless of style of language or choice of vocabulary in the input text evidence 53.

Given one or more pieces of evidence 50, the relevance engine 10 generates, for each piece of content in the Content Database 20, an estimate of the likelihood that the piece of content is relevant given the available evidence 50. To do this, the relevance engine 10 queries each of the plurality of language-based statistical models with the text evidence 53. The relevance engine outputs the most probable or the p most probable pieces of content as content suggestions 30, which may optionally be presented to a user 5. Preferably, the p most relevant content suggestions 30 are presented to the user as representations of the p most relevant pieces of content, where the representation may include one or more of text, an image, a video clip, etc.

By way of a non-limiting example, if the piece of content in question is a particular movie, the Content Database 20 associates that movie with the content type 'movies, films and videos' and the associated data sources for the movie may comprise conversations via email, Twitter, Facebook etc. of that movie, reviews of that movie (including critics reviews published on news websites and/or user reviews posted on websites such as IMDB, Rotten Tomatoes and Amazon, etc.), news-strings related to that movie, the URL address of that movie, the number of times the movie has been searched for, the popularity rating of the movie, etc. The movie is also associated with a representation of that movie, e.g. a URL address to the official website for the movie, the poster image released for the movie, the name of the movie, etc. The text dataset associated with that movie comprises text extracted from a plurality of the different data sources, and this text dataset is used to train a language-based statistical model associated with the movie.

If the relevance engine 10 received text 54 which mentioned "movie" and an actor's name, the relevance engine 10 would generate a relevance likelihood estimate for each piece of content by, for example by feeding the terms "movie" and the actor name through each language-based statistical model. The relevance engine 10 is configured to rank the estimated likelihoods for the pieces of content and return the most probable pieces of content as content suggestions 30, which may include a movie starring that actor, which may be represented by the movie name, the movie picture, etc. Since each language-based statistical model is associated with its corresponding piece of content, an estimate from that language-based statistical model is linked to the piece of content.

Following on from the above, the particular piece of content may relate to a broad entity, e.g. movies, films, and videos, as well as something more specific than the broad entity, e.g. the particular film. A particular piece of content could relate to something even narrower, for example, it could relate to reviews of that particular film (taken form a plurality of data sources). The particular pieces of content may therefore be associated with broad entities (or content type), where the content suggestions 30 comprise an entity or content type as well as, or instead of, a particular piece of content.

As will be understood from the detailed description below, the relevance engine 10 can take into account additional types of evidence, which need not be word-based evidence. For example, if the user had a history of reviewing books and seldom searched for movies, a suggestion to a book which has recently been made into a movie with the actor may be outputted as a content suggestion by the relevance engine, despite the input text stating "movie" and an actor's name.

There are arbitrarily many potential sources of evidence, some examples of which include:
- the current focus of the user's attention (Focus Evidence 55)
- the wider context in which this focus is situated (Context Evidence 54)
- evidence about the type of content a given user is interested in (Content Type Evidence 52), e.g. movies, books, art, etc.
- evidence that relates specifically to a given user, e.g. previously generated language, click history or social context/demographic (User Evidence 53)

The relevance engine 10 generates an estimate for each piece of content given each evidence source, as is explained below. For each piece of content, the relevance engine 10 is configured to combine the estimates for the evidences sources 50 to generate an overall estimate for that piece of content, as described later. The relevance engine 10 is configured to rank the overall estimates in order to output the k most probable pieces of content or representations therefore as content suggestions 30. To do this, the relevance engine 10 may be configured to treat each of the evidence sources as independent, i.e. a user's click history as independent from the text input, which is also independent from the content type 52 etc.

General Model

As discussed, the relevance engine 10 is configured to rank pieces of content by their likelihood of relevance given evidence 50. To achieve this, the relevance engine 10 may be configured to produce a ranking of pieces of content in the Content Database 23 by making a series of point-estimates of the following form:

$$P(c|E)$$

Where c is a piece of content in the Content Database 20 and E is the set of all observed evidence 50. 'c' is used as shorthand for 'c is relevant'.

Expanding equation 1 using Bayes' rule yields:

$$P(c|E) = \frac{P(E|c)P(c)}{P(E)}$$

This yields three distinct terms for the relevance engine to estimate independently to determine the likelihood of the content, c, being relevant given the set of all observed evidence 50, E:

P(c): the content prior
P(E): the evidence prior
P(E|c): the content conditional likelihood If only a ranking of the relevance of the pieces of content given the observed evidence is required (rather than a probability estimate), the relevance engine 10 need not estimate the evidence prior, P(E).

Content Prior

The prior probability of content relevance, P(c), is a measure of the likelihood that a piece of content will be relevant, in the absence of any specific evidence related to an individual user or circumstance. It can be modelled by the relevance engine 10 using an aggregate analysis of general usage patterns across all data sources (e.g. webpages) associated with that piece of content. One such method is presented below.

Various metrics are correlated with the frequency of user interactions with the data sources associated with a piece of content, and/or its perceived popularity:

Number of incoming links to pages that contain a representation of that content

Number of data source views, where the data source is associated with the content Number of user comments or ratings related to the data source associated with that content User interactions with a data source may be assumed to be generated by a random variable Interact where its domain is C X (0,1] (where C is the set of all data sources, (0,1] is the set of real numbers greater than 0 and less than or equal to 1 and X is the Cartesian product). It can be assumed that an independent and identically distributed (i.i.d) sequence of samplings of Interact model all individual user interactions with all data sources, i.e. each random variable has the same probability distribution as the others and all are mutually independent. The real value (from here 'weight') associated with each interaction represents the 'positivity' of the interaction. For example a 'like', or an 'up-vote' would be highly positive, a page view would be more neutral, and a 'down-vote' would be given a very low weight. This assignment of positive weight to any interaction assumes that any interaction, even if it expresses a negative sentiment towards the content, adds to the prior probability of relevance of a piece of content. The weighting scheme will be determined heuristically, but should be chosen so that the average weight of a user interaction will be 0.5. This constraint will help to ensure that the distribution of weights is comparable across all data sources, the priors of which will be calculated separately.

The observed sequence of interaction events $\{Interact_i\}$ can be utilized to generate a prior of content relevance.

For each piece of content c, the relevance engine 10 sums the weights which correspond to the data sources of that piece of content to obtain an aggregate score. Finally, a normalisation can be performed over these sums by the relevance engine 10 to obtain a probability distribution, which can be used to model the prior probability of relevance. Mathematically:

$$P(c \text{ is relevant}) = \Sigma \{Weight(Interact_i) | DataSource(Interact_i) = c\}$$

As described above, the interactions for a particular data source can be normalised over all data sources. Alternatively, if desired, the interactions for a data source can be normalised over all data sources for that type of data sources, e.g. normalise interactions with a YouTube video by all interactions with all YouTube videos or normalise interactions with a Wikipedia webpage across all interactions with all of the webpages of Wikipedia. This may be desirable if the user interacts in different ways dependent on the data source type. Alternatively, interactions for a data source can be normalised over the type of interaction, for example, normalising click history for a particular webpage over all click histories for all data sources.

The relevance engine 10 may be configured to smooth the prior distribution by adding a fixed number of interactions with weight 0.5 to each data source in the domain to compensate for a lack of interaction data to generate our model. This smoothing could also be used to reduce the impact of the prior, or to artificially favour certain data sources.

There are many further information sources that may be good candidates for inclusion in the prior. For instance, recency (how recently a data source associated with a piece of content was generated) could be important, particularly in the case where up-to-date content is particularly relevant, e.g. if the information need is for breaking news. The prior might also contain information about how "trusted" a particular data source is, i.e. content from the British Broadcasting Corporation (the BBC) is a-priori more relevant than content from a moderately unknown blog.

Evidence Prior

Because the evidence prior, P(E), is constant with respect to the target content, c, it does not affect the ranking of results and can be ignored by the relevance engine 10 if an ordering over content is all that is required from the system. It is therefore optional as to whether the relevance engine 10 is configured to estimate the evidence prior, dependent on whether a true probability estimate is desirable, for example to compare results across different system queries.

A number of approaches can be used by the relevance engine 10 to approximate this distribution; for instance, if the evidence in question is language, the relevance engine 10 can consider the probability of the evidence being drawn from a generic language distribution which covers all content, e.g. a large, non-targeted corpus of text data. In practice, though, this is computationally difficult to manage, and may not result in stable estimates.

Another approach that can be employed by the relevance engine 10 is to compute the evidence prior as a marginalisation over all individual pieces of content, which can be approximated by choosing a subset of pieces of content that represent the most relevant entities to represent the whole distribution. This may lead to a poor approximation to the true evidence prior, but normalises the range of returned values and in most cases it yields some consistency across system queries.

This approach leads to an overall estimate as follows:

$$\sum P(c|E) = 1 \Rightarrow$$
$$P(E) = \sum P(E|c)P(c)$$

Preferably, the system is configured to approximate the above expression by finding a subset $C_k$ (of size k) of pieces of content deemed most relevant to the query, the implementation of which is described in detail below. These k pieces of content can then be ranked by the relevance engine 10 to achieve a final ranking over content. The exact value of k will depend on the amount of computational power available to the system and the desired query response time.

Since the top k retrieval is designed to find the subset of all content that is likely to have a degree of relevance to the query, the vast majority of the probability mass is likely to be allocated to these top k. Hence, the relevance engine 10 can be configured to normalise over the top k, as above, to obtain estimates for the prior probability of the evidence.

Evidence Conditional Likelihood

In order to compute the evidence likelihoods, $P(E|c, M_c)$, of observing the evidence, E, given that a particular piece of content, c, is relevant under a content-specific statistical model $M_c$ the relevance engine 10 is preferably configured to separate the evidence 50, E, into non-overlapping, mutually independent sets, $[e1, \ldots, en]$, that are independently generated from some distribution, conditioned on a target piece of content c and an associated content-specific statistical model $M_c$. This independence assumption can be written as:

$$P(E|c, M_c) = \prod_i P(e_i|c, M_c)$$

The evidence likelihood $P(E|c, M_c)$ is therefore calculated by the relevance engine 10 as a product of the probability estimates for the independent evidence sources $e_i$. The relevance engine is therefore preferably configured to calculate the individual evidence estimates separately.

There is a statistical model, M, for each piece of content associated with each evidence source, and the relative impact of individual evidence sources may be controlled by the relevance engine 10 using a per-distribution smoothing hyper-parameter which allows the system to specify a bound on the amount of information yielded by each evidence source. This can be interpreted as a "degree of belief", or confidence, in each evidence source. An aggressive smoothing factor on an evidence source (with the limiting case being the uniform distribution, in which case the evidence source is essentially ignored) relative to other evidence sources will reduce the differences between probability estimates for an evidence source conditioned on data sources associated with different pieces of content. The distribution becomes flatter as the smoothing increases, and the overall impact of the evidence source on the probability, $P(E|c, M_c)$, diminishes.

Specific Likelihood Estimates

Different evidence sources 50 are characterised by different types of data. For instance, the Focus Evidence 55 takes the form of language text data, whereas the User Evidence 53 is modelled from a combination of language data (i.e. user query) and behavioural data (such as views of data sources associated with a particular piece of content and click graphs, etc.). In each case, we will describe the type of data for each evidence source, and the modelling techniques used by the relevance engine 10 to generate likelihood estimates.

Context 54 and Focus 55 Evidence

To take an example, the user could be viewing a web page primarily composed of text, such as a news article, in which case the focus text 55 may constitute the paragraph or sentence they are currently viewing, and the context 54 may be the remainder of the text on the page. The use of the context provides a way to ground the focused content results in the broader themes the user is viewing. To take another example, if a user has formulated a query expressing an information need (e.g. something along the lines of "I want to type faster on my phone") then this query may be taken as the Focus Evidence 54 and there may be no Context Evidence 55.

The Context 54 and Focus 55 Evidence sources can be denoted by $e_c$ and $e_f$ respectively. An estimate for the probability of observing the text given the content is relevant, under a model M is $P(e_t|c, M)$, where it is assumed that an underlying language distribution is responsible for generating both the training text associated with a given piece of content in the Content Database 20, and also the evidence text, whether focus 55 or context 54. There are several techniques which could be applied by the relevance engine 10 to compute the required estimate, such as:

naive Bayesian modelling
maximum entropy modelling
statistical language modelling The first two approaches are based on extracting a set of features from text and training a generative model on those extracted features, while statistical language modelling attempts to model a sequential distribution over the terms in the text (e.g. by training a language model on n-gram sequences within the text). These approaches are fundamentally related. By way of providing a non-limiting example, the first approach will be described.

A set of features is extracted by the relevance engine 10 from a given sample of text, representing either the focus 55 or context 54, preferably by using any suitable feature extraction mechanism. To generate a relevance estimate, the relevance engine 10 assumes that these features have been independently generated by an associated language-based statistical model.

The relevance engine 10 is configured to determine estimates of the probability of a given feature occurring in the relevant content distributions by querying the content-specific statistical models with that feature. Each content-specific statistical model is preferably trained on features extracted from text associated with that statistical model. A model trained in this way therefore comprises the features of the text and their frequency of occurrence in the text. An estimate of the probability of a given feature being relevant to a particular entity is therefore stored in the associated statistical model via the frequency statistics, as described below. The relevance engine 10 can therefore query the content-specific statistical model to determine if it contains that feature and, if so, its frequency of occurrence.

There are various methods used in the art for the generation of these features from the raw textual evidence, any one of which can be employed by the relevance engine 10. For example:

'Bag-of-words' term presence/absence: The features are the set of unique words used in the text.

Unigram: The features are simply the words of the text. This model results in words which appear multiple times being given proportionally greater weight.

Term combination: Features may include combinations of terms, either contiguous n-grams or representing non-local sentential relations.

Syntactic: Features may include syntactic information such as part-of-speech tags, or higher level parse tree elements.

Latent topics/clusters: Features may be sets/clusters of terms that may represent underlying "topics" or themes within the text.

Preferably, features may be weighted by the relevance engine 10 in order to exaggerate the importance of those which are known to have a greater chance a priori of carrying useful information with respect to the task. For instance, for term features, this is normally done using some kind of heuristic technique which encapsulates the scarcity of the words in common English (such as term frequency-inverse document frequency, TFiDF), since unusual words are more likely to be indicative of the relevant content-specific statistical models than common words. TFiDF is defined as:

$$TF-IDF(t) = \frac{tf(t)}{df(t)}$$

where tf(t) is the number of times term t occurs in the user inputted text, and df(t) is the number of content-specific statistical models in which t occurs across all content-specific statistical models.

A detrimental consequence of the independence assumption on features is that samples (i.e. system queries) of different length are described by different numbers of events, which can lead to spurious discrepancies in the range of values returned by different system queries. The relevance engine 10 can compensate for this by employing a normalization process. If there are D features in a statistical model, these can be represented by distinct dimensions in a real valued D-dimensional space, and a given input sample may be represented by a real valued D-dimensional vector ('an input feature vector'). The relevance engine 10 can achieve normalization by converting each input feature vector (which corresponds to a set of weighted features), vi, to unit length by dividing by the vector magnitude |v|.

Thus, the probability, P(e|c, M), of observing the evidence, e, given that a particular piece of content, c, is relevant under an associated content-specific statistical model M is computed as a product over independent features, $f_i$, extracted from the observed textual evidence (e.g. input sample), e:

$$P(e \mid c, M) = \prod_i P(f_i \mid c, M)$$

The relevance engine 10 is configured to query the Content Database 20 with each feature $f_i$. The Content Database 20 returns a list of all of the content-specific statistical models comprising that feature and the probability estimate associated with that feature for each content-specific statistical model. The probability, P(e|c, M), of observing the evidence, e, given that piece of content, c, is relevant under a content-specific statistical model, M, is computed as a product of the probability estimates for all of the features $f_i$ of the observed evidence e, over all of the content-specific statistical models M that comprise those features $f_i$.

The above expression is rewritten, taking $g_i$ to be each unique feature which has occurred a given number of times ($n_i$, where $f_i = g_i n_i$) in the evidence (e.g. system query), e:

$$P(e \mid c, M) = \prod_i P(g_i \mid c.M)^{n_i}$$

Adding in the TFiDF weighting, $n_i$ is replaced with its corresponding weight, which is denoted as $w_i$. The weight vector w may be a vector containing the TiFDF scores for all features extracted from the evidence. The weight vector w is preferably normalized to have unit length.

The resulting expression is:

$$P(e \mid c, M) = \prod_i P(g_i \mid c, M)^{w_i}$$

And converting to logs:

$$\log(P(e \mid c, M)) = \sum_i w_i \cdot \log(P(g_i \mid c, M))$$

The above can be rewritten as the dot product of two vectors, one representing the weights ('the input feature vector') and the other representing the log probabilities:

$$\log(P(e \mid c, M)) = w \cdot v$$

In order to compute the above, an estimate of P(gi|c,M), i.e. the content dependent feature likelihood, is needed. The relevance engine 10 takes this estimate from the content-specific statistical model which has been trained on the text associated with the piece of content. For instance, the estimate of the content dependent feature likelihood may be obtained through a maximum likelihood estimate, using a scaled frequency count of that feature in the text associated with the piece of content or the frequency count of that feature as stored in the content-specific statistical model. In the case that the features are individual lexical terms, for example, the training corpus may be comprised of the terms t0, . . . , tk each of which appears n0, . . . , nk times. To derive a probability estimate for some term ti given the piece of content c, the following equation can be used:

$$P(t_i \mid c) = \frac{n_i}{\sum_i n_i}$$

However, if the content dependent feature likelihood estimate for any features in the evidence is zero (because, for example, the term is not present in the corpus or the content-specific statistical model), the final probability P(E|c, M) would be zero. If the training corpus is sparse, it is unlikely that every feature in our textual evidence will have been observed in the training corpus for the target content, and hence that feature may not appear in any of the content-specific statistical models. Hence, it is preferable for the relevance engine 10 to apply some form of smoothing to reallocate some of the probability mass of observed features to unobserved features.

There are many widely accepted techniques for smoothing the frequency-based probabilities. For example, Laplace smoothing using the following formula may be used:

$$P(t_i \mid c) = \frac{n_i + k}{\sum_i n_i + kV}$$

Where ti and ni are as before, and V is the total vocabulary of the text dataset associated with the piece of content (a subset of all words of the language). k is a constant to be determined heuristically.

The relevance engine 10 can therefore determine which piece of content is the most relevant given the evidence by querying each content-specific statistical model of the content database 20 with features $f_i$ extracted from the evidence to determine which content-specific statistical model provides the greatest probability estimate (since the content-specific statistical models are mapped to corresponding pieces of content).

Feature Engineering

As discussed above, a key component of the text based evidence sources 54, 55 is the choice of features selected to represent the underlying language. Various techniques as known in the art can be used to engineer text-based features, e.g.:

Case normalization: case variants of words may be treated as completely unconnected features. Since there is no guarantee that the query has been capitalised correctly (e.g. in the case of voice input), it may prove better to normalise using the relevance engine 10 the case of both training data and query text. Alternatively, the relevance engine 10 may interpolate between case variants, although this may dramatically increase query time. The exact approach taken may well depend on the domain the system is deployed in.

Stemming: Stemming refers to the reduction of words to a base or root form. This means that case or tense variants of verbs will be mapped to the same stem, as will many cognates. Stemming both training data and queries can often improve results, since it combats the sparsity of features in the training data—not every morphological variant of a word will appear in the training data for a piece of content, but unseen variants are still likely to be indicative of the relevance of that piece of content.

Content Type Evidence

The likelihood estimate for the Content Type Evidence source 54 is a distribution over content types (which may also correspond to entities). For instance, if a user formulates a query such as "I want to watch a romantic movie that will make me cry" the target content type in this case is clearly movies.

The relevance engine 10 can be configured to separate the query and find the part that indicates the type of content that the user wants to see. In the previous example, "I want to watch" would be a clear cue that the user wants information about a movie. If this text is referred to as evidence of content type, $e_t$, then the content type evidence is formulated as:

$$P(e_t|c,M)$$

The probability of generating text similar to "I want to watch" is dependent on the latent content type that the user wants to see (e.g., movies). This type comes from a discrete set of classes, and can be referred to as $z \in Z$ When summing over all possible content types, the following equation is provided:

$$P(e_t | c, M) = \sum_{z \in Z} P(e_t | z, c, M) \times P(z | c, M)$$

If it is assumed that the evidence $e_t$ is only dependent on the content type z, and not the piece of content c, then this can be simplified further:

$$P(e_t | c, M) = \sum_{z \in Z} P(e_t | z, M) \times P(z | c, M)$$

The value of P(z|c,M) is 1 if z matches c, and 0 otherwise. For example $$P(z=movie|c=Inception)=1$$

$$P(z=wikipedia|c=Inception)=0$$

Therefore, only one term of the sum remains:

$$P(e_t|c,M)=P(e_t|z_c,M)$$

where $z_c$ is the intent class z that matches the item class c. This can further be expanded using the Bayes rule. $P(e_t|M)$ is constant, and $P(z_c \vee M)$ can be chosen to be uniform, in which case neither of these terms will affect the final ranking of different concepts:

$$P(e_t | c, M) = P(e_t | z_c, M) = \frac{P(z_c | e_t, M) \times P(e_t | M)}{P(z_c | M)} \propto P(z_c | e_t, M)$$

The probability of the content type given the evidence can be estimated by using a classifier 60 (e.g. a discriminative classifier). Such a classifier 60 will automatically learn which features of the input query are discriminative between different content types. Since the features not related to the content type are expected to have a very low weight, the whole query can be classified instead of explicitly attempting to extract the relevant section.

Possible feature types useful for this task include:
Unigrams, bigrams, higher-order n-grams
Lemmas and word stems
Phrases and chunking
Prefixes and suffixes
Named entities
Word senses
Part-of-speech tags
Parse tree substructures
Dependency relations
Parse tree/dependency graph similarity using appropriate kernels The same classifier 60 can be used to classify the content-specific statistical models into content type. As described above, the content database 20 can comprise the content-specific statistical models structured by content type.

Finally, as the classifier 60 is configured to predict the content type given the input query, this classification (with associated probability distribution) can be used in a pre-processing step. By classifying the query into one or more content types, the relevance engine can restrict the search space to content-specific statistical models which are within that content type, which is described in more detail below, thereby speeding up the ranking and retrieval process.

User Evidence

Preferably, the system takes into account the individual preferences of a given user by modelling a distribution based on their past behaviour.

Two sources of evidence related to a specific user, that may be considered are:
1) The language they have previously generated.
2) Their prior interaction with data sources associated with pieces of content.

Although the relevance engine 10 has been described above, in relation to a specific embodiment in which it is configured to generate content suggestions 30 from multiple evidence sources, the relevance engine may be configured to generate content suggestions from textual evidence only. Similarly, although a classifier 60 can be used to determine content type, and to reduce the search space through this classification, the classifier and the use of content type evidence are optional features of the search system.

Implementation and Optimization of the Search System

If a complete analysis as detailed above were carried out by the relevance engine 10, it would need to carry out o(CN) operations (where C=number of pieces of content, N=number of textual features). In practice, this is not usually plausible since C will be in the order of millions or higher.

The search system may make use of several techniques and approximations to reduce the complexity of the searching task performed by the relevance engine 10, for example by reducing both the number of features and/or the number of pieces of content under consideration for a particular corpus of text. The optimisations discussed below relate primarily to the textual aspect of the searching, but similar optimisations could be employed more generally.

Query Reduction:

Since the system detailed attempts to deal with much longer queries than traditional search systems, the system, in practice, may require a procedure for reducing the number of features of the input query which should be considered (since, generally speaking, the query time will be linear in the number of features considered). There are herein described two mechanisms for achieving this feature pruning in the textual evidence case, although more sophisticated techniques, such as syntax parsing, could be used, but may be too computationally expensive in practice.

As detailed earlier, the features of textual evidence can be weighted by their TFiDF so as to scale down the importance of common English words or words which appear infrequently in the text inputted. To increase processing speed, the relevance engine 10 (or any other filtering mechanism used in combination with the relevance engine 10) may be configured to discard all textual features which have a TFiDF value lower than a certain threshold (for example, the threshold may be determined by the length of the text), because features with a low TFiDF weighting will, in general, have a minimal impact on the overall probability estimates. Furthermore, low TFIDF terms ('stop words') also tend to have a reasonably uniform distribution of occurrence across content corpora, meaning their impact on the probability estimates will also be reasonably uniform across pieces of content. Hence, removing them as features will make relatively little difference to the ranking of the pieces of content, and by reducing the number of features the relevance engine 10 uses to query the Content database 20, the processing speed is increased. A similar approach could be utilised to prune n-gram features (under an analogous feature-weighting scheme) if the content-specific statistical model is a language model trained on n-gram features extracted from the training text.

Alternatively, or in addition, the relevance engine 10 may remove or ignore entire clauses or phrases of the query using a language-modelling based classifier 60. The system query can be split into chunks of some length $q_1, \ldots, q_i$ (this will only be plausible in the case of long natural language queries as opposed to more traditional search engine queries which only consist of a few terms). Two language models are generated, one based on natural language drawn from a general corpus (Background LM), and one from natural language drawn from a conversational corpus (Foreground LM) which could comprise email or social media communications. For each query chunk $q_{j1}$, the classifier may perform model comparison (such as calculating the difference in n-gram perplexity under the two models for $q_j$) to determine which of the two language models is a better fit for the chunk. For long queries, chunks that are classified as being closer to the conversational model are expected to be less useful in determining associated relevant pieces of content. Therefore, all chunks which are deemed conversational (perhaps at a certain confidence level) may be ignored by the relevance engine 60. This has the potential to significantly reduce query length which will contribute to improving system response times and reducing noise.

Limiting the Number of Content Candidates:

'Top-k retrieval' is key to the performance of most information-retrieval systems, and a feature of the system (e.g. the classifier 60) may be configured to retrieve the top k entities, as mentioned previously. The top-k retrieval may be performed in addition to or instead of the reduced query. The top-k stage acts a first pass to reduce the number of candidate pieces of content, which can then be ranked by the relevance engine 10, using a more computationally expensive procedure.

The number of content-specific statistical models that the relevance engine 10 needs to query with the textual features $f_i$ extracted from the observed evidence can be reduced by the following method. For each textual feature f of the observed evidence (e.g. the system query), with TFiDF t (normalised to be in the range [0,1]), the system finds the k. t pieces of content which have the highest probabilistic association with f, where this set of pieces of content is denoted $C_f$, and k is constant. The system can then take the union across all textual features $C=U_{f \in F}C_f$ to obtain a set of candidate pieces of content which is bounded above by |F|. k in size. The relevance engine 10 may then 'score' the evidence with respect to this limited set of pieces of content. Clearly, since k is likely to be small compared to the original number of pieces of content, this provides a significant performance improvement (search time is linear in the number of candidate pieces of content). The validity of this step is also plain—if a candidate piece of content is not in the set $C_f$ for any feature f, then it is highly unlikely that the 'score' for the evidence for that piece of content will be high enough for it to be worth calculating (i.e. it is unlikely to appear in the results which we wish to return to the user). The choice of k can be made so as to not hinder the performance of the system while still giving a substantial performance improvement The top k pieces of content may be determined by a discriminative classifier 60 which is configured to determine the type of content to which the system query relates, and return only the pieces of content for that content type. For example, as previously explained, the classifier 60 may classify the content-specific statistical models by content type. The classifier 60 can classify the input text by content type to determine the relevant content-specific statistical models. Where the content-specific language model relates to multi content types, for example, where it has been trained on text associated with a film, a book, a webpage, etc., the content-specific statistical model may be assigned to multiple classification types. The content type may be a broad entity that is associated with content-specific statistical models. The system query can therefore be used to search for content-specific statistical models associated with a relevant entity. As described above, in order to facilitate content type or entity suggestions, the Content Database 20 may be structured by content type or entities.

One example of a suitable classifier 60 is described in detail in WO 2011/042710, which is hereby incorporated by reference in its entirety. As will be understood from that disclosure and the above description, the features extracted from the user inputted text can be used to generate an input feature vector. The content-specific statistical models may each comprise a content-specific feature vector generated from the features extracted from the text associated with the piece of content. The classifier 60 can then take the dot product of the input feature vector with each of the content-specific feature vectors to determine the relevance of each piece of content to the content-specific statistical model. To reduce the number of dot products that are required to be generated, since the classifier is used as an initial filter only, the content-specific statistical models can be grouped into content type or broad entities (e.g. people, animals, clothing, etc.), where that content type or broad entity has associated with it a content-type feature vector or entity-specific feature vector generated from the content-specific feature vectors or generated from features extracted from the text sources associated with all of the pieces of content for that content type or broad entity. The classifier 60 then takes the dot product of the input feature vector with each content type vector or entity-specific feature vector, to determine the one or more content types or entities most relevant given the search query. The classifier 60 passes data (e.g. a list of identifiers mapped to the models) regarding the most relevant content-specific statistical models to the relevance engine 10. The relevance engine 10 then queries each of the most relevant content-specific language models with each input feature to determine the one or more most relevant pieces of content and output content suggestions 30, as described in detail above.

Any other suitable solution for retrieving the top k pieces of content can be employed, for example by using Apache Lucene (http://lucene.apache.org/) or by using a k-nearest neighbour approach (http://en.wikipedia.org/wiki/Nearest_neighbor_search#k-nearest_neighbor), etc. The value for k will depend on device capabilities versus accuracy requirements and computational complexity (for example, the number of features, etc.).

Post-Processing Steps

There are two post-processing procedures which may be employed by the relevance engine to aid the presentation of the results to the end-user, for example via an electronic display of the electronic device. These procedures comprise a normalisation technique to restore real probabilities and an algorithm which can be used to threshold the results displayed to the user (in the case of streaming temporal evidence).

Thresholding Results in a 'Streaming Evidence' Scenario

In a scenario where the textual evidence is a stream of data, such as a radio broadcast or the transcript of some content being viewed by the user 5 on TV, the textual evidence may be presented to the end-user in real time. The streaming text is may therefore also be provided to the system as chunks of textual data in real time. The chunks of text can be labelled as ordered pairs $[c_i, t_i]$ of text and a time-stamp. For each chunk, the relevance engine 10 will return a results set $r_i$, which will consist of pieces of content and associated probabilities of relevance. In order to improve the user experience, the relevance engine 10 preferably limits the number of these results which are displayed to the user (for example, being displayed via a display of the electronic device). There are many ways the relevance engine 10 can be configured to do this. By way of a non-limiting example, below is provided, an algorithm which attempts to show a highly relevant result at reasonably frequent intervals.

The relevance engine 10 may define an initial probability threshold value 7 and a threshold half-life T (to be determined by the domain and the user's preferences). Initialize a 'Most Likely Recent Content' (abbreviated as MLRC henceforth) as a pair of the empty content with a probability of 0.

Whenever the relevance engine 10 receives a chunk result set (at time $t_i$), it performs two processing steps:

Firstly, it examines the highest probability result, r (with associated probability p) from the result set for this chunk. If this result r has a higher probability than that of the MLRC, then set the MLRC to [r,p].

Secondly, the system calculates a new threshold value by using the previous threshold value and the time since the previous chunk was received ($\Delta t$). This can be calculated by the relevance engine 10 as:

$$NewThreshold = OldThreshold * 0.5^{(\Delta t/T)}$$

If the probability of the MRLC is greater than this threshold value, then the content of the MLRC is outputted from the relevance engine 10 and displayed to the user, e.g. on a display, then the MRLC is reset to [empty concept, 0] and the threshold is reset to the initial value π. The relevance engine 10 can therefore determine whether the current content suggestion 30 (e.g. most relevant piece of content or representation thereof) is to be updated, based on whether the relevance of the new piece of content is of a higher probability than the current piece of content and whether the difference is greater than a time-based threshold (e.g. so a piece of content grows less relevant over time)

The present invention also provides a corresponding method for searching for relevant pieces of content given text input and optionally one or more additional evidence sources. Turning to FIG. 1 and the above described search system, the method comprises receiving text input, generating an estimate for each of a plurality of pieces of content of the likelihood that the piece of content is relevant given the text input, and preferably outputting one or more of the most relevant pieces of content as content suggestions. The content suggestions preferably comprise representations of the most relevant pieces of content, as described previously.

As described above in relation to the system, a method for determining whether a piece of content is relevant to text input, comprises receiving text input (e.g. a user entered system query) at the search system, and generating, using a statistical model trained on text associated with a piece of content, an estimate of the likelihood that the piece of content is relevant given the text input, where the text associated with the piece of content is drawn from a plurality of different data sources.

Other aspects of the method of the present invention can be readily determined by analogy to the above search system description. For example, the estimates of the likelihoods that the pieces of content are relevant are preferably based on a plurality of evidence sources, one of which is the text input.

The present invention also provides a computer program product comprising a computer readable medium having stored thereon computer program means for causing a processor to carry out the method according to the present invention.

The computer program product may be a data carrier having stored thereon computer program means for causing a processor external to the data carrier, i.e. a processor of an electronic device, to carry out the methods according to the present invention.

It will be appreciated that this description is by way of example only; alterations and modifications may be made to the described embodiment without departing from the scope of the invention.

The invention claimed is:

1. A system comprising:
   one or more processors; and
   one or more storage medium comprising program instructions, wherein execution of the program instructions by the one or more processors causes the one or more processors to:
   receive text input comprising one or more n-grams;
   identify a content type indicated by the one or more n-grams of the text input using a classifier model, wherein the classifier model is trained with a set of text segments and associated content type labels for each text segment, and wherein the content type identifies a subject matter of the one or more n-grams of the text input, the subject matter being representable in a plurality of representation formats;
   in response to identifying the content type for the text input, select a single statistical model from among a set of statistical models, wherein each statistical model of the set of statistical models is associated with a respective content type, based on datasets of content used to train the respective statistical model and wherein the selection is based on the identified content type, indicated by the one or more n-grams of the text input, matching the content type of the statistical model;

generate, with the selected statistical model, a relevance estimate for a content item in relation to the one or more n-grams of the text input, wherein the selected statistical model is trained with text associated with the content item and a relevance value in relation to the text and the content item, and wherein the text associated with the content item is drawn from a plurality of different data sources; and output the content item as a content suggestion when the relevance estimate of the content item exceeds a predetermined relevance threshold.

2. The system of claim 1, wherein the statistical model is trained on one or more features extracted from the text associated with the content item, and wherein execution of the program instructions by the one or more processors causes the one or more processors to:

extract the one or more features from the text input, and query the statistical model with each of the one or more features of the text input to generate the relevance estimate for the content item in relation to the text input.

3. The system of claim 1, wherein execution of the program instructions by the one or more processors causes the one or more processors to:

generate a respective relevance estimate for each content item of a plurality of content items in relation to the text input using a statistical model, associated with each content item, selected from a plurality of statistical models, and trained on text associated with pieces of content items; and rank the plurality of content items by the respective relevance estimate and determine one or more of the most relevant content items based on the relevance estimate.

4. The system of claim 3, wherein execution of the program instructions by the one or more processors causes the one or more processors to output at least one representation of each of the one or more most relevant content items.

5. The system of claim 3, wherein at least one content item is associated with a particular entity and wherein execution of the program instructions by the one or more processors causes the one or more processors to output at least one representation of one or more entities associated with the one or more most relevant content items.

6. The system of claim 3, wherein execution of the program instructions by the one or more processors causes the one or more processors to:

classify, by content type, each of the plurality of statistical models trained on text;

classify the text input as a content type; and determine a subset of the plurality of statistical models which are classified the same content type as the content type of the text input.

7. The system of claim 1, wherein execution of the program instructions by the one or more processors causes the one or more processors to:

compare a portion of the text input to a first language model trained on natural language text;

compare the portion of the text input to a second language model trained on conversational text; and classify the portion of the text input as natural language or conversational.

8. The system of claim 1, wherein the plurality of representation formats include at least one of a text file, an image, a video clip, or a URL.

9. A method for determining whether a content item is relevant to text input, the method comprising:

receiving text input comprising one or more n-grams;

identifying a content type indicated by the one or more n-grams of the text input using a classifier model, wherein the classifier model is trained with a set of text segments and associated content type labels for each text segment, and wherein the content type identifies a subject matter of the one or more n-grams of the text input, the subject matter being representable in a plurality of representation formats;

in response to identifying the content type for the text input, selecting a single statistical model from among a set of statistical models, wherein each statistical model of the set of statistical models is associated with a respective content type, based on datasets of content used to train the respective statistical model and wherein the selection is based on the identified content type, indicated by the one or more n-grams of the text input matching the content type of the statistical model;

generating, with the selected statistical model, a relevance estimate for a content item in relation to the one or more n-grams of the text input, wherein the selected statistical model is trained with text associated with the content item and a relevance value in relation to the text and the content item, and wherein the text associated with the content item is drawn from a plurality of different data sources; and outputting the content item as a content suggestion when the relevance estimate of the content item exceeds a predetermined relevance threshold.

10. The method of claim 9, further comprising:

extracting, using one or more processors, one or more features from the text input; and querying, using one or more processors, the statistical model with each of the one or more feature of the text input to generate the relevance estimate for the content item in relation to the text input.

11. A non-transitory computer-readable medium containing program instructions for determining whether a content item is relevant to text input, wherein execution of the program instructions by one or more processors of a computer system causes the one or more processors to:

receive text input comprising one or more n-grams;

identify a content type indicated by the one or more n-grams of the text input using a classifier model, wherein the classifier model is trained with a set of text segments and associated content type labels for each text segment, and wherein the content type identifies a subject matter of the one or more n-grams of the text input, the subject matter being representable in a plurality of representation formats;

in response to identifying the content type for the text input, select a single statistical model from among a set of statistical models, wherein each statistical model of the set of statistical models is associated with a respective content type, based on datasets of content used to train the respective statistical model and wherein the selection is based on the identified content type, indicated by the one or more n-grams of the text input, matching the content type of the statistical model;

generate, with the selected statistical model, a relevance estimate for a content item in relation to the one or more n-grams of the text input, wherein the selected statistical model is trained with text associated with the content item and a relevance value in relation to the text and the content item, and wherein the text associated with the content item is drawn from a plurality of different data sources; and output the content item as a content suggestion when the relevance estimate of the content item exceeds a predetermined relevance threshold.

12. The non-transitory computer-readable medium of claim 11, wherein the text input is not input into the computer system by a user.

13. The non-transitory computer-readable medium of claim 11, wherein execution of the program instructions by the one or more processors causes the one or more processors to:

receive non-textual evidence; and generate using a statistical model that is trained on non-textual data the relevance estimate for the content item in relation to the non-textual evidence.

14. The non-transitory computer-readable medium of claim 11, wherein execution of the program instructions by the one or more processors causes the one or more processors to:

classify, by content type, each of a plurality of statistical models trained on text;

classify the text input as a content type; and determine a subset of the plurality of statistical models which are classified the same content type as the content type of the text input.

15. The non-transitory computer-readable medium of claim 14, wherein the selected statistical model is trained on one or more features extracted from the text associated with the content item, wherein execution of the program instructions by the one or more processors causes the one or more processors to:

extract the one or more features from the text input, and query each of the statistical models of the subset of statistical models with each of the one or more features of the text input to generate a relevance estimate for each content item associated with each statistical model of the subset of statistical models in relation to the text input.

16. The non-transitory computer-readable medium of claim 11, wherein execution of the program instructions by the one or more processors causes the one or more processors to:

compare a portion of the text input to a first language model trained on natural language text;

compare the portion of the text input to a second language model trained on conversational text; and classify the portion of the text input as natural language or conversational.

17. The non-transitory computer-readable medium of claim 16, wherein execution of the program instructions by the one or more processors causes the one or more processors to discard the portion of the text input if it is classified as conversational.

* * * * *